United States Patent
Kusada et al.

(10) Patent No.: US 8,012,559 B2
(45) Date of Patent: Sep. 6, 2011

(54) OPTICAL INFORMATION RECORDING MEDIUM

(75) Inventors: Hideo Kusada, Osaka (JP); Tomiharu Hosaka, Kyoto (JP); Noboru Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 341 days.

(21) Appl. No.: 12/373,802

(22) PCT Filed: Aug. 30, 2007

(86) PCT No.: PCT/JP2007/066859
§ 371 (c)(1),
(2), (4) Date: Apr. 17, 2009

(87) PCT Pub. No.: WO2008/026676
PCT Pub. Date: Mar. 6, 2008

(65) Prior Publication Data
US 2009/0317581 A1     Dec. 24, 2009

(30) Foreign Application Priority Data
Sep. 1, 2006 (JP) .............................. P 2006-237662

(51) Int. Cl.
*B32B 3/02* (2006.01)
(52) U.S. Cl. .................... 428/64.1; 428/64.4; 428/64.5; 428/64.6; 430/270.13
(58) Field of Classification Search .................. 428/64.1, 428/64.4; 430/270.13
See application file for complete search history.

(56) References Cited

U.S. PATENT DOCUMENTS

| | | | |
|---|---|---|---|
| 6,858,277 B1 | 2/2005 | Yamada et al. | |
| 7,063,876 B2 * | 6/2006 | Nishihara et al. | 428/64.1 |
| 2004/0121261 A1 | 6/2004 | Ashida et al. | |
| 2004/0191686 A1 | 9/2004 | Kitaura et al. | |
| 2005/0058941 A1 | 3/2005 | Yamada et al. | |
| 2005/0064334 A1 | 3/2005 | Hirotsune et al. | |
| 2005/0119123 A1 | 6/2005 | Yamada et al. | |

FOREIGN PATENT DOCUMENTS

| | | |
|---|---|---|
| JP | 2002-293025 | 10/2002 |
| JP | 2004-178673 | 6/2004 |
| JP | 2004-303350 | 10/2004 |
| JP | 2004-311011 | 11/2004 |
| JP | 2005-119263 | 5/2005 |
| WO | 00/54982 | 9/2000 |

OTHER PUBLICATIONS

International Search Report dated Oct. 9, 2007 in the International (PCT) Application PCT/JP2007/066859 of which the present application is the U.S. National Stage.

* cited by examiner

*Primary Examiner* — Elizabeth Mulvaney
(74) *Attorney, Agent, or Firm* — Wenderoth, Lind & Ponack, L.L.P.

(57) ABSTRACT

An optical information recording medium having the same recording volume as that of DVD-ROM is obtained which shows excellent characteristics at recording linear velocities within a range of twice linear velocity of DVD (about 8.2 m/s) to five times liner velocity of DVD (about 20.5 m/s) and excellent archival stability, by a construction including a transparent substrate, a recording layer which is formed on the substrate directly or with another layer interposed therebetween and can change in phase reversibly by a laser beam irradiation, wherein the composition of the recording layer is within a region bounded by composition points A(41.2, 7.4, 51.4), B(39.8, 10.5, 49.7), C(28.5, 21.7, 9.8), and D(30.6, 15.8, 53.6) in a triangular coordinate graph represented with a coordinate of (Ge, Sb—Bi, Te) and a Bi content in the recording layer is 4 atom % and more and less than 13 atom %.

13 Claims, 4 Drawing Sheets

OPTICAL INFORMATION RECORDING MEDIUM

TECHNICAL FIELD

The present invention is related to an optical information recording medium (which may be called merely as "recording medium" or "medium") on or from which information signal is recorded or reproduced by applying a high-energy light beam such as a laser beam on a thin film formed on a substrate.

BACKGROUND ART

Local heating by irradiation of a laser beam causes a phase change between an amorphous phase and a crystal phase of a thin film formed from a chalcogen material or the like on a substrate. The phases have different optical constants (a refractive index n and an extinction k) and such difference is caused by difference of the irradiation conditions. This is widely known and development and commercialization of a so-called phase-change type optical information recording medium are now actively advanced.

Applying the laser beam to the phase-change type optical information recording medium is made by applying the laser beam to an information track. The laser beam is applied while a laser power is modulated, depending on the information signals, between at least two power levels, one being a recording level and the other being a erase level. This makes it possible to erase existing signals from and record new signals on the medium at the same time.

In the optical information recording medium, protective layers, as layers other than the recording layer, are provided with the recording medium therebetween in a thickness direction. In other words, the protective layers are formed as a layer which is located nearer to the incoming laser beam (lower side), and a layer which is located further from the incoming laser than the recording layer (upper side). The protective layer is provided for preventing the evaporation of the recording layer and the thermal deformation of the substrate which are subjected to repetitive recording, and enhancing an optical absorbance and an optical change of the recording layer by optical interference effect. The protective layer is generally made from a dielectric material which has excellent heat resistance. Further, a reflective layer formed from a metal or an alloy material is generally provided in order to use the incoming light efficiently and to improve a cooling speed of the recording layer so that the recording layer is easily made amorphous. The reflective layer is formed at a position further from the incoming laser beam than the recording layer, that is, a position where it reflects the laser beam which has passed through the recording layer.

It is proposed that an interface layer is provided between the recording layer and the dielectric layer. The interface layer serves to promote the crystallization of the recording layer so that the erase characteristic is improved, and to prevent the mutualdiffusion of atoms or molecules between the recording layer and the dielectric protective layer so that the durability against the repetitive recording is improved. It is preferable that the interface layer is not liable to exfoliate from the recording layer and has environment reliability such that corrosion does not occur.

Further, it is proposed that a layer of a material which has a high refractive index and absorbs the light moderately is provided between the upper dielectric layer and the reflective layer. The purposes of providing this layer are as follows:

i) A ratio of the optical absorbance of the recording layer in crystal phase and the optical absorbance of the recording layer in amorphous phase is adjusted to suppress deformation of the mark shape upon overwriting, whereby the erase ratio is improved; and ii) Difference in reflectivity between the recording layer in crystal phase and the recording in amorphous phase is made large to increase a C/N ratio.

In order that an information volume stored in one optical information recording medium, it is necessary to optimize an optical system for high-density recording. Basically, it is necessary to reduce a spot diameter of the laser beam by shortening a wavelength of the laser beam or increasing a numerical aperture of an objective lens which focuses the beam. The main stream of high-capacity recording mediums is one which requires the use of the optical system of a wavelength of 660 nm/a numerical aperture of about 0.6, which is represented by a recordable DVD (Digital Versatile Disc). Further, a recordable BD (Blu-ray Disc) has been commercialized, which requires the use of the optical system of a wavelength of 400 nm/a numerical aperture of about 0.85. A blue laser diode is employed for the recording and the reproduction of this medium.

In addition, a recording medium of multi-layer construction (which is also called as "multi-layer recording medium") is also proposed, wherein a plurality of layers on or from which information is recorded or reproduced are stacked. The recording and the reproduction is made, on the information layer(s) which is further from a laser source in such a multi-layer recording medium, by using the laser beam which is damped since the information layer(s) nearer to the laser source absorbs the light. For this reason, there is a problem of decrease in sensitivity when recording, and there is a problem of reduction in reflectivity and amplitude when reproducing. Therefore, it is necessary to design the information layer(s) nearer to the laser source such that it has a high transmittance, and the information layer(s) which is further from the laser source such that it has a high reflectance, a large difference in reflectance, and a high sensitivity. This enables sufficient recording and reproduction characteristics with a limited laser power.

In the optical information recording medium, it is also important to increase a recording speed for processing a large volume of data for a short period of time while, as described above, it is important to increase the recording density. Among the mediums, a recordable DVD adapted to 5× recording includes a medium which is adapted to a wide range of linear velocity covering from a low linear velocity (linear velocity 8.2 m/s; 2× recording) to a a high linear velocity (liner velocity 20.5 m/s; 5× recording). The ratio of these linear velocities is 2.5 and therefore this medium is adapted to a very wide range of linear velocity.

The crystallization speed of the recording layer is required to be increased in order to adapt to the high-speed recording. A known technique of increasing the crystallization speed is, for example, changing a representative recording material Ge—Sb—Te, in particular, a composition around GeTe—$Sb_2Te_3$ (a composition which is positioned near a GeTe—$Sb_2Te_3$ line in a constitution diagram of a Ge—Sb—Te three-component system) to another composition around GeTe—$Bi_2Te_3$ by substituting Sb with Bi. Further, a technique of substituting a part of Sb with Bi (for examples, Patent Literatures 1 and 2)

Patent Literature 1: WO00/54982
Patent Literature 2: Unexamined Japanese Patent (Kokai) Publication No. 2004-311011

DISCLOSURE OF INVENTION

As described above, there is tendency that the recording speed of the recording and reproduction apparatus which is newly developed is higher, and therefore the medium adapted to this high speed is also required. Further, in order to ensure compatibility with an existing drive whereby only the low-speed recording can be conducted, one medium is required to be recordable not only at a high speed, but also at a low speed.

The recording layer having a high crystallization speed as described above, is required to be employed in order that the medium is adapted to the high-speed recording. However, when the medium with recording layer formed of a material which is obtained by substituting Sb with Bi as described above, is used for the low-speed recording, the crystallization speed is too high to ensure the recording characteristic at a low speed.

Further, as disclosed in Unexamined Japanese Patent (Kokai) Publication No. 2004-311011, the recording characteristics such as C/N and the erase ratio are ensured with relative ease at the low speed (for example, a linear velocity of 8.2 m/s) and the high speed (for example, a linear velocity of 20.5 m/s) when a part of Sb in the composition around GeTe—$Sb_2Te_3$ (the composition which is positioned near a GeTe—$Sb_2Te_3$ line in a constitution diagram of a Ge—Sb—Te three-component system) is substituted with Bi. It has been, however, difficult to ensure the long-term archival characteristic of marks recorded at the respective linear velocities and the high-speed overwrite characteristic. In other words, it has been difficult to establish both of the long-term archival characteristic of the mark recorded at the low speed (to maintain the amorphous state and the erase characteristic (to promote the crystallization) when overwriting marks at the high speed after the mark recorded at the high speed were preserved for a long period of time.

Furthermore, Unexamined Japanese Patent (Kokai) Publication No. 2004-311011 describes that one or more elements may be added optionally, selected from semimetals, semiconductor elements, or metals such as Sn, In, Ga, Zn, Cu, Ag, A, or Cr, additional Ge, Bi, Sb, Te, or non-metal elements such as O, N, F, C, S, B for the purpose of adjusting the crystallization speed, thermal conductivity or the optical constant, or durability against repetitive recording, heat resistance or environment reliability. The additive amount of those elements is 20 atom % or less, preferably 10 atom % or less, and particularly preferably 5 atom % or less. This publication, however, does not consider the reflectance, jitter characteristic, the sensitivity and the long-term archival characteristic of the disk. Of course, the publication does not specify what and how additive material is added for ensuring those properties. Further, the publication does not describe specifically the effect given by the additive material and does not refer to the quantification of the additive material.

The inventors made the recording layers from various materials consisted of Ge, Sb, Bi and Te (which is called as "Ge—Sb—Bi—Te-based material" hereinafter) and evaluated the reflectance, the recording sensitivity, the jitter characteristic, and the repetitive overwrite characteristic (cycle characteristic) and the long term archival characteristic. As a result, it has been found that it is difficult to satisfy all the above properties when the recording layer is formed from a GeTe compound and a $Sb_2Te_3$ compound and the crystallization speed is adjusted by increasing or decreasing the ratio of a $Bi_2Te_3$ compound.

Then, the inventors considered addition of Sb to a recording layer composition consisted of the GeTe compound, the $Sb_2Te_3$ compound and the $Bi_2Te_3$ compound. In other words, an amount of the $Bi_2Te_3$ compound in the composition of the GeTe compound and the $(Sb—Bi)_2Te_3$ compound is determined, which amount establishes the recording characteristics for low-speed recording at 8.2 m/s and high-speed recording at 20.5 m/s. In such a composition, the $Sb_2Te_3$ compound is replaced with a minute amount of the $Bi_2Te_3$ compound to give a composition whose crystallization speed is further increased. Then, Sb is further added to lower the crystallization speed for the purpose of achieving a balance with the recording characteristics.

As a result, it was found that when the recording layer contains the GeTe compound, the $Sb_2Te_3$ compound, the $Bi_2Te_3$ compound and Sb and the contents of the respective components are within specific ranges, the reflectance, the recording sensitivity, the repetitive overwrite characteristic, and the long term archival characteristic of the recording medium are all satisfied well, which results in the present invention.

The present invention provides an optical information recording medium as means to solve the problems, which is described hereinafter.

<1> The present invention provides an optical information recording medium including a transparent substrate, a recording layer which is formed on the substrate directly or with another layer interposed therebetween and can change in phase reversibly by irradiation of a laser beam, wherein:

the recording layer includes a Ge—Sb—Bi—Te-based material consisting of Ge, Sb, Bi and Te; and a composition of the Ge—Sb—Bi—Te-based material is within a region which is bounded by the respective composition points $A(Ge_{41.2}, (Sb—Bi)_{7.4}, Te_{51.4})$, $B(Ge_{39.8}, (Sb—Bi)_{10.5}, Te_{49.7})$, $C(Ge_{28.5}, (Sb—Bi)_{21.7}, Te_{49.8})$, and $D(Ge_{30.6}, (Sb—Bi)_{15.8}, Te_{53.6})$ in a triangular coordinate graph whose apices are Ge, Sb—Bi and Te; and characterized in that a content of Bi contained in the Ge—Sb—Bi—Te-based material is 4 atom % and more and less than 13 atom %. The term "atom %" means a content whose basis (100%) is the total numbers (or counts) of Ge atoms, Bi atoms, Sb atoms, and Te atoms. The recording may include another element(s) other than Ge, Sb—Bi and Te, or may be consisted only of Ge, Sb—Bi and Te. In the latter case, the composition of the Ge—Sb—Bi—Te-based material is the composition of the recording layer itself.

This optical information recording medium has the same capacity as a DVD-ROM and excellent characteristic even if the recording is conducted at twice the linear velocity of DVD (about 8.2 m/s) and at 5 times the linear velocity of DVD (about 20.5 m/s). Further, the medium is excellent in archival stability.

<2> The recording layer may further contain at least one element selected from Ag, In, Se, Sn, Al, Ti, V, Mn, Fe, Co, Cr, Ni, Cu, Zn, Zr, Ga, Si, Dy, Pd, Pt, Au, N, O, S, B, C and P. In that case, the total amount of the at least one element is preferably 5 atom % or less.

The above-listed elements are, for example, impurities in a film-forming apparatus, or impurities contained in a member for sputtering the recording layer. Even if these are contained in the recording layer, the effect of the present invention is not impaired as long as the content of the elements are up to 5 atom %. The term "atom %" used herein indicates the content which is represented by based on the total numbers of Ge atoms, Bi atoms, Sb atoms and Te atoms (100%).

<3> The optical information recording medium of the present invention preferably includes a first protective layer, a second protective layer and a reflective layer, and has a construction wherein the first protective layer, the recording layer, the second protective layer and the reflective layer are placed in this order from a side nearer to a plane of incidence of a laser beam. The functions of the first protective layer, the second protective layer and the reflective layer are as described in connection with Background Art.

<4> It is preferable that the first protective layer contains ZnS in an amount of 60 mol % or more, and has a film thickness of 100 nm or more and less than 150 nm. Or, ZnS may be contained in such form as the total amount of Zn and S is 60 atom % or more in the first protective layer.

A ZnS material is suitable for a material of the protective layer, since it has a low optical absorbance for a laser beam with a wavelength of from 405 nm to 860 nm, and excellent durability against water. Further, when a thin film material which contains ZnS as a main component is formed by sputtering, a sputtering rate is higher as a proportion of ZnS is higher, whereby the thin film is formed at a high speed. In the case where the film thickness is 100 nm or more and less than 150 nm, a large difference can be obtained between the reflectance of the recording layer in crystalline state and the reflectance of the recording layer in amorphous state, resulting in the recording medium with excellent recording characteristic.

<5> It is preferable that the second protective layer contains ZnS in an amount of 60 mol % or more, and has a film thickness of 35 nm or more and less than 55 nm. Or, ZnS may be contained in such form as the total amount of Zn and S is 60 atom % or more in the second protective layer.

The ZnS material is excellent as the material for the protective layer because of the reason described in the above <4>. When the film thickness of the second protective layer is 35 nm or more, a distance between the recording layer and an optical absorption layer (which is described below) and a distance between the recording layer and the reflective layer are large. This makes it difficult for the heat to escape from the recording layer which is heated by the laser beam, whereby the recording sensitivity is improved. When the film thickness is 55 nm or less, it is made easy to increase the reflectance of the disk and the heat can be moderately drawn from the recording layer. For this reason, the recording layer is easily made being in the amorphous state from the crystal state, even when the recording is conducted at a low speed, resulting in more favorable jitter characteristic. In other words, the film thickness of 35 nm or more and less than 55 nm of the second protective layer makes it possible to give the recording medium which is excellent in the recording sensitivity, the reflectance, and the jitter characteristic at the time of low-speed recording.

<6> In the recording medium described in the above <3>, a first interface layer is preferably provided between the first protective layer and the recording layer.

<7> In the recording medium described in the above <3>, a second interface layer is preferably provided between the second protective layer and the recording layer.

The provision of the interface layer tends to give the recording medium which is excellent in the repetitive overwrite characteristic (the cycle characteristic) and corrosion resistance. In the recording medium described in the above <3>, both of the first and the second interface layers may be provided.

<8> In the recording medium described in the above <5> or <6>, it is preferable that the first interface layer and/or the second interface layer is made of a material containing a Zr oxide and has a film thickness of 0.5 nm or more and less than 10 nm.

The material containing Zr oxide is preferably used since it has high barrier function and is tough and hard. The material containing Zr oxide is favorable in the jitter characteristic, the durability against repetitive recording, the environment reliability (non-corrosivity) of the recording medium. When the film thickness of the interface layer is 0.5 nm or more and less than 10 nm, the thermal characteristic and the barrier function are both established, resulting in the recording medium which is excellent in the jitter characteristic and the durability against environment. When the thickness of the interface layer is less than 0.5 nm, it may crack due to volume change of the recording layer which is caused by the phase change of the recording layer. When the film thickness is more than 10 nm, the heat is confined in the recording layer to promote recrystallization, which makes it difficult to form a large recording mark.

<9> The film thickness of the recording layer is preferably 5 nm or more and 15 nm or less. When the film thickness of the recording layer is 5 nm or more, the reflectance of the disk is easily ensured. When the film thickness of the recording layer is 15 nm or less, the jitter characteristic, the cycle characteristic and the long-term archival characteristic can be made excellent.

<10> In the medium described in the above <3>, it is preferable that the reflective layer is made of a material containing Ag in an amount of 90 atom % or more, and has a film thickness of 60 nm or more and less than 140 nm.

The use of Ag which is excellent in thermal conductivity as the material for the reflective layer, heat quantity is rapidly diffused, which is applied, by irradiation of laser, to the recording layer vicinity. Therefore, the amorphous mark is easily formed at the time or low-speed recording, resulting in the recording medium having excellent jitter characteristic at the low-speed recording. Further, the recording medium which diffuses heat excellently and presents excellent jitter characteristic at the time of low-speed recording, can be realized, when the reflective layer has a thickness of 60 nm or more. The recording medium which presents excellent jitter characteristic can be easily realized, when the reflective layer has a thickness of less than 140 nm.

<11> The medium described in the above <3> may further have an optical absorption layer. The optical absorption layer is disposed between the reflective layer and the second protective layer. The optical absorption layer serves to adjust a ratio of Ac/Aa wherein Ac is an optical absorptivity of the recording medium in crystal state, and Aa is the optical absorptivity of the recording medium in amorphous state, and suppress the deformation of the mark shape at the time of overwriting.

<12> The present invention also provides an optical information recording medium including two or more recording layers, wherein at least one recording layer includes the Ge—Sb—Bi—Te-based material. The recording layer including the Ge—Sb—Bi—Te-based material having a particular composition described in <1> gives the effect of this material to the information layer having the recording layer.

<13> The constructions or elements described in the above <1> to <12> may be combined. For example, the constructions of <4> and <5> may be combined so that both of the first and the second protective layers contain ZnS in an amount of 60 mol % or more. Or, the constructions of the above <4> and <5> and the construction of the above <10> may be combined. Or, the construction of the above <3> may be combined with the construction of the above <12>.

The optical information recording medium of the present invention is one wherein the recording layer includes Ge, Sb—Bi and Te and the contents of these elements are within the predetermined ranges. This recording medium shows excellent characteristics and excellent archival stability even when the recording is conducted at a recording linear velocity of from twice the linear velocity of DVD (about 8.2 m/s) to five times the linear velocity of DVD (about 20.5 m/s).

DESCRIPTION OF REFERENCE NUMERALS

Figure 1:
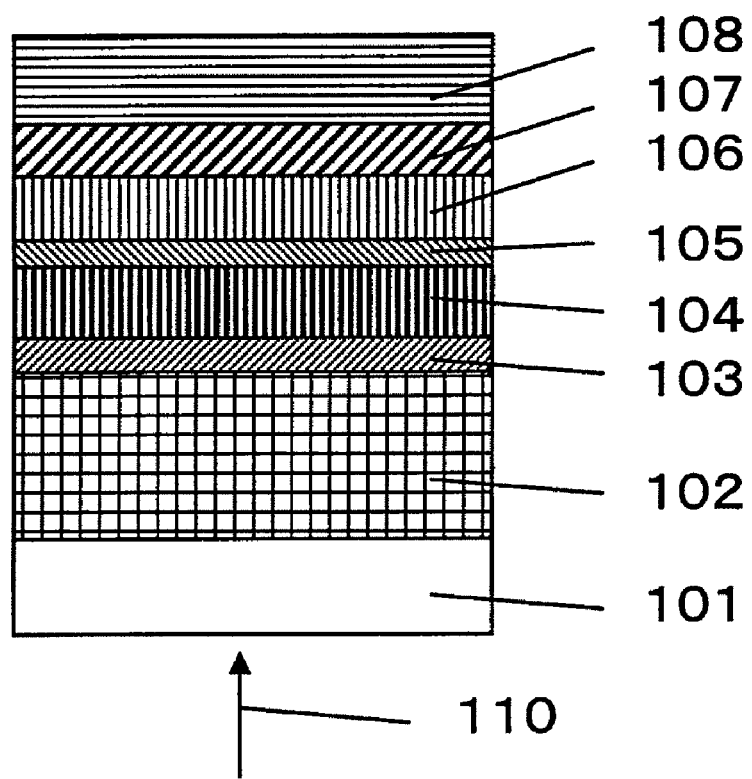
FIG. 1 is a cross-sectional view schematically showing an optical information recording medium of the present invention.

101 Substrate
102 First protective layer
103 First interface layer
104 Recording layer
105 Second interface layer
106 Second protective layer
107 Optical absorption layer
108 Reflective layer
110 Laser beam

BEST MODE FOR CARRYING OUT THE INVENTION

The preferable embodiments of the present invention are described below with reference to the drawings. An optical information recording medium shown in FIG. 1 has a constitution wherein a first protective layer 102, a first interface layer 103, a recording layer 104, a second interface layer 105, a second protective layer 106, an optical absorption layer 107 and a reflective layer 108 are formed in this order on a substrate 101. In general, an adhesive layer (an ultraviolet curable resin) is formed on a surface of the reflective layer 108 and a protective substrate is bonded to the adhesive layer (not shown).

The present invention is, however, not limited to the above construction. Another material layer may be interposed optionally between the layers. Further, a construction wherein the first interface layer and/or the second interface layer are not provided may be employed, and a construction wherein the optical absorption layer is not provided may be employed.

The substrate 101 is generally a transparent plate of a disc-shape. A guide groove for guiding a laser beam may be formed on a surface where the dielectric layer and the recording layer and so on are formed. When the guide groove is formed in the substrate and the cross section thereof is viewed, it is found that a groove portion and a land portion are formed. The groove portion can be said to be positioned between the two adjacent land portions. Therefore, the surface where the guide groove is formed has a top face and a bottom face which are connected by side walls. In the present specification, a bottom face is called as a "groove face" and a top face is called as a "land face." When seeing from the side of the laser beam 110, the groove face is always positioned nearer to the laser beam 110 and the land face is always further from the laser beam 110. The recording marks are formed on the surface of the recording layer which is positioned on the groove face (groove recording), or on the surface of the recording layer which is positioned on the land face (land recording), or on both of the surfaces of the recording layer which are positioned on both of the groove face and land face (land-groove recording).

The materials for the substrate 101 include a resin such as polycarbonate, amorphous polyolefin, or PMMA, or glass. Considering the moldability, the price, and the mechanical strength, polycarbonate is preferably used.

The height of convexity and convex which construct the land portion and the groove portion (that is, a distance between the top face and the bottom face: it may be referred to as "groove depth") preferably satisfies $\geq \lambda/(10 \cdot n)$ and $< \lambda/(2 \cdot n)$ wherein $\lambda$ is a wavelength of the laser beam used, and n is a refractive index that is a real part of a complex refractive index of the substrate. When the groove depth is less than $\lambda/(10 \cdot n)$, it is difficult for the laser beam to track the land portion or the groove portion stably. When the groove depth is $\lambda/(2 \cdot n)$ or more, it is difficult to form the groove stably over the entire substrate.

It is preferable that the material for the first protective layer 102 is thermally stable. The first protective layer 102 is preferably formed from a material containing at least one compound selected from zinc compounds such as ZnS, ZnSe, ZnTe, ZnPo, ZnC, ZnSi, ZnGe, ZnSn, ZnP, ZnAs, ZnSb and ZnBi, and oxides, nitrides, fluorides, carbides and sulfides of Al, Ga, In, Tl, Si, Ti, Zr, Hf and Cu. The film thickness of the first protective layer is $\geq 15 \cdot \lambda/(64 \cdot nl)$ and $< (40 \cdot \lambda)/(64 \cdot nl)$ wherein $\lambda$ is the wavelength of the laser beam for reproduction and nl is a refractive index of the first dielectric layer. It is difficult to make the thickness less than $15 \cdot \lambda/(64 \cdot nl)$, or $(40 \cdot \lambda)/(64 \cdot nl)$ or more from the viewpoint of optical design.

It is preferable that the optical information recording medium of the present invention further includes the first interface layer 103 between the first protective layer 102 and the recording layer 104 and the second interface layer 105 between the recording layer 104 and the second protective layer 106. The interface layer further improves the erase characteristic and the repetitive recording characteristic. The first interface layer 103 and the second interface layer 105 are preferably made from a material containing a Zr oxide which is dense and hard, and excellent in the barrier function. For example, the interface layer is more preferably formed from a mixture of the Zr oxide (for example, $ZrO_2$) and a compound(s) selected from nitrides, oxides, carbides and sulfides which contain at least one element selected from a element group consisting of Al, Si, Ti, Co, Ni, Ga, Ge, Sb, Te, In, Au, Ag, Zn, Bi, Pt, Pd, Cd, P, Ca, Sr, Cr, Y, Se, La and Li. The interface layer of such a mixture improves the recording characteristic, the cycle characteristic and the environment reliability.

As the mixture, a mixture represented by the following formula is particularly used.

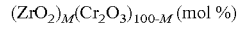

(wherein M is a compositional ratio represented by mol % and satisfies 20=M=80.)

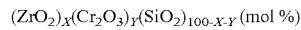

(wherein X and Y are compositional ratios represented by mol % and satisfies 20=X=70 and 20=Y=60 and 60=X+Y=90.)

In these formulas, $ZrO_2$ may be a partially-stabilized $ZrO_2$ wherein a part of $ZrO_2$ (for example, 10 mole or less) is substituted with $Y_2O_3$. These mixtures improve the recording characteristic, the cycle characteristic and the environment reliability, synergically with the Ge—Sb—Bi—Te-based material contained in the recording layer.

The film thickness of each of the first interface layer 103 and the second interface layer 105 is preferably 0.5 nm or more and less than 10 nm, and more preferably 1.0 nm or more and less than 5.0 nm. When the film thickness is 0.5 nm or more, the film having high barrier function is obtained, resulting in the recording medium which is more excellent in the corrosion resistance. When the film thickness is less than 10 nm, the heat is difficult to be transmitted in the film face direction of the interface layer. Therefore, when the laser beam is applied to the recording layer in the groove track or the land track, the beam does not tend to affect the recording mark written in the adjacent track(s), whereby the deterioration of the recording mark can be suppressed In the optical information recording medium of the present invention, the recording layer 104 includes the Ge—Sb—Bi—Te-based material which consists of Ge, Sb and Bi (this combination is abbreviated as "Sb—Bi" hereinafter) and Te. The composition of this Ge—Sb—Bi—Te-based material exists in a region bounded by the composition points $A(Ge_{41.2}, (Sb—Bi)_{7.4}, Te_{51.4})$, $B(Ge_{39.8}, (Sb—Bi)_{10.5}, Te_{49.7})$, $C(Ge_{28.5}, (Sb—Bi)_{21.7}, Te_{49.8})$, and $D(Ge_{30.6}, (Sb—Bi)_{15.8}, Te_{53.6})$ in a triangular coordinate graph whose apexes are respective elements of Ge, Sb—Bi and Te. Further, a content of Bi contained in this Ge—Sb—Bi—Te-based material is 4 atom % or more and less than 13 atom %. The compositional range of the Ge—Sb—Bi—Te-based material contained in the recording layer of the present invention is described in more detail using the triangular coordinate graph shown in FIG. 2.

In the graph, "A" is a composition on a line which is drawn from the composition in which a molar ratio of the GeTe compound/the $(Sb—Bi)_2Te_3$ compound is 12:1 (in the graph, "E") toward (Sb—Bi), wherein the content of Sb and/or Bi is 0.5 atom % more than that in the composition of "E." In the graph, "B" is a composition on a line which is drawn from the composition in which a molar ratio of the GeTe compound/ the $(Sb—Bi)_2Te_3$ compound is 12:1 (in the graph, "E") toward (Sb—Bi), wherein the content of Sb and/or Bi is 4 atom % more than that in the composition of "E." In the graph, "C" is a composition on a line which is drawn from the composition in which a molar ratio of the GeTe compound/ the $(Sb—Bi)_2Te_3$ compound is 4:1 (in the graph, "F") toward (Sb—Bi), wherein the content of Sb and/or Bi is 8 atom % more than that in the composition of "F." In the graph, "D" is a composition which is drawn from the composition in which a molar ratio of the GeTe compound/the $(Sb—Bi)_2Te_3$ compound is 4:1 (in the graph, "F") toward (Sb—Bi), wherein the content of Sb and/or Bi is 0.5 atom % more than that in the composition of "E."

Here, the $(Sb—Bi)_2Te_3$ compound is a compound containing the $Sb_2Te_3$ compound and the $Bi_2Te_3$ compound (or a mixture of these two compounds). As the proportion of $Bi_2Te_3$ compound is higher, the crystallization speed of the recording layer is higher, resulting in the recording medium having excellent jitter characteristic at the time of high-speed recording. However, when the proportion of $Bi_2Te_3$ compound is high, the recording mark (in amorphous state) tends to be crystallized. As a result, the mark recorded at a low speed is preserved for a long period of time, the recording mark tends to be small, whereby the jitter characteristic tends to be deteriorated (low-speed archival deterioration).

Further, as the proportion of $Bi_2Te_3$ compound is lower, the crystallization speed of the recording layer is slower, resulting in the recording medium having excellent jitter characteristic at the time of low-speed recording. The recording mark, however, is difficult to be erased. In particular, the erase characteristic is remarkably deteriorated when the mark recorded at a high speed is overwritten at a high speed after being preserved for a long period of time (high-speed archival overwrite deterioration). It is considered that the cause of this is that the amorphous state is transferred to a metastable state during the long-term preservation, whereby the mark is difficult to be crystallized.

When the content of the $Bi_2Te_3$ compound in the composition of the recording layer in, for example, the 2×-5× overwritable DVD-RAM medium, described in "Background Art" is optimized so that excellent jitter characteristic is obtained at any one of the linear velocities, there is a problem that either of the low-speed archival deterioration and the high-speed archival overwrite deterioration is remarkable.

One aspect of the present invention consists in that the recording layer is constructed so that it consists of or includes the GeTe compound, the $Sb_2Te_3$ compound, the $Bi_2Te_3$ compound and Sb. In other words, the one aspect of the present invention consists in that the both of the archival deterioration and the archival overwrite deterioration are suppressed by the addition of Sb. In the recording medium of such construction, it is considered that a part of Sb is substituted with Bi of the $Bi_2Te_3$ compound, finally producing excess Bi. Therefore, another aspect of the present invention consists in that the recording layer is constructed so that it consists of or includes the GeTe compound, the $Sb_2Te_3$ compound, the $Bi_2Te_3$ compound and Bi. A still another aspect of the present invention consists in that the recording layer is constructed so that it consists of or includes the GeTe compound, the $Sb_2Te_3$ compound, the $Bi_2Te_3$ compound, and Bi and Sb.

The present invention can give such a recording as
1) the jitter characteristic is excellent when the recording is made at from a low speed of 8.2 m/s recording to a high speed of 20.5 m/s, compared with the prior art recording medium (wherein the recording medium consists of the GeTe compound, the $Sb_2Te_3$ compound and the $Bi_2Te_3$ compound, and the crystallization speed is adjusted by the amount of the $Bi_2Te_3$ compound); and
2) both of the low-speed archival deterioration and the high-speed archival overwrite deterioration are suppressed.

The detail of the reason therefor is not known, but it is considered that the tendency of occurrence of phase transition upon forming the recording mark or erasing the recording mark in a short time of several nano seconds by the irradiation of the laser beam, largely depends on the crystallization speed, while the archival characteristic of the recording mark (the suppression of the archival deterioration and the archival overwrite deterioration) by the prevention of the transition of the amorphous state to the crystal or the metastable state, depends on the additive amount of Sb and/or Bi.

The Ge—Sb—Bi—Te-based material which is obtained by adding Sb to a mixture of the GeTe compound-the $Sb_2Te_3$ compound—the $Bi_2Te_3$ compound is described hereinafter. The additive amount of Sb is preferable 0.5 atom % or more and more preferably 1 atom % or more. When a minute amount of Sb is added, a difference in extinction coefficient ($\Delta k$) between the case where the recording layer is crystalline state and the case where the recording layer is amorphous state becomes large, whereby difference in reflectivity is increased between the case where the recording layer is crystalline state and the case where the recording layer is amorphous state. As a result, the disk medium can be provided, wherein the optical contrast is large and therefore the jitter characteristic is excellent. When the additive amount is in a range of 2 atom % to 3 atom %, $\Delta k$ is maximized. When Sb is added in an amount larger than that amount, $\Delta k$ tends to be decreased monotonically. Therefore, the upper limit of the additive amount of Sb is preferably 8 atom % or less and more preferably 7 atom % or less.

In the above, there is described a method for obtaining the Ge—Sb—Bi—Te-based material existing in the region bounded by the respective apexes "A", "B", "C" and "D", by adding Sb to the mixture of the GeTe compound—the $Sb_2Te_3$ compound—the $Bi_2Te_3$ compound. In the present invention, the predetermined composition may be obtained by a technique of adding only Bi, or both of Sb and Bi, as long as the Ge—Sb—Bi—Te-based material has the predetermined composition. Even if any of technique is employed for preparing the composition, it is necessary to include Bi in an amount as described below in the composition.

The content of Bi in the Ge—Sb—Bi—Te-based material is preferably 4 atom % or more and less than 13 atom %, whose basis (100%) is the total numbers of Ge, Sb, Te and Bi atoms, and more preferably 5 atom % or more and less than 12 atom %. The proportion of the $Bi_2Te_3$ compound in the (Sb—Bi)$_2$Te$_3$ compound and/or the additive amount of Sb and/or Bi are determined so that this condition is satisfied.

The inclusion of Bi of 4 atom % or more makes it possible to increase the crystallization speed of the recording medium, resulting in the recording medium which has excellent jitter characteristic at the time of high-speed recording. The inclusion of Bi of less than 13 atom % ensures the jitter characteristic at the time of low-speed recording. In other words, the content of Bi within the range of not less than 4 atom % and less than 13 atom % enables the recording medium to be used over a wide range of linear velocity.

As the mol ratio of the GeTe compound to the (Sb—Bi)$_2$Te$_3$ compound, namely the value of GeTe/[(Sb—Bi)$_2$Te$_3$] is larger, the proportion of the (Sb—Bi)$_2$Te$_3$ compound is lower and therefore the amount of the $Bi_2Te_3$ compound is smaller. For example, when the value of GeTe/[(Sb—Bi)$_2$Te$_3$] is 16, the total content of Sb and Bi is 5.4 atom %, and the recording layer can contain Bi in an amount of less than 5.4 atom %.

To the contrary, when the value of GeTe/[(Sb—Bi)$_2$Te$_3$] is small, for example, two, the total content of Sb and Bi is 22.2 atom %, and the recording layer can contain Bi in an amount of less than 22.2 atom %.

In other words, as the value of GeTe/[(Sb—Bi)$_2$Te$_3$] is smaller, more $Bi_2Te_3$ compound is contained in the recording layer and increases the crystallization speed. The high crystallization speed which is due to the high content of the $Bi_2Te_3$ compound can be adjusted by adding Sb in a large amount, which enables the crystallization speed of the recording layer to be adjusted and the characteristic of the recording medium to be improved.

Therefore, the value of GeTe/[(Sb—Bi)$_2$Te$_3$] is preferably smaller in the recording medium of the present invention. The lower limit of the value is preferably the "F" composition in FIG. 2 (where the value of GeTe/[(Sb—Bi)$_2$Te$_3$] is four). GeTe affects the reflectance of the medium. When the proportion of the GeTe compound is smaller than the "F" composition, it becomes difficult to make the reflectance of the recording medium being high.

Figure 2:
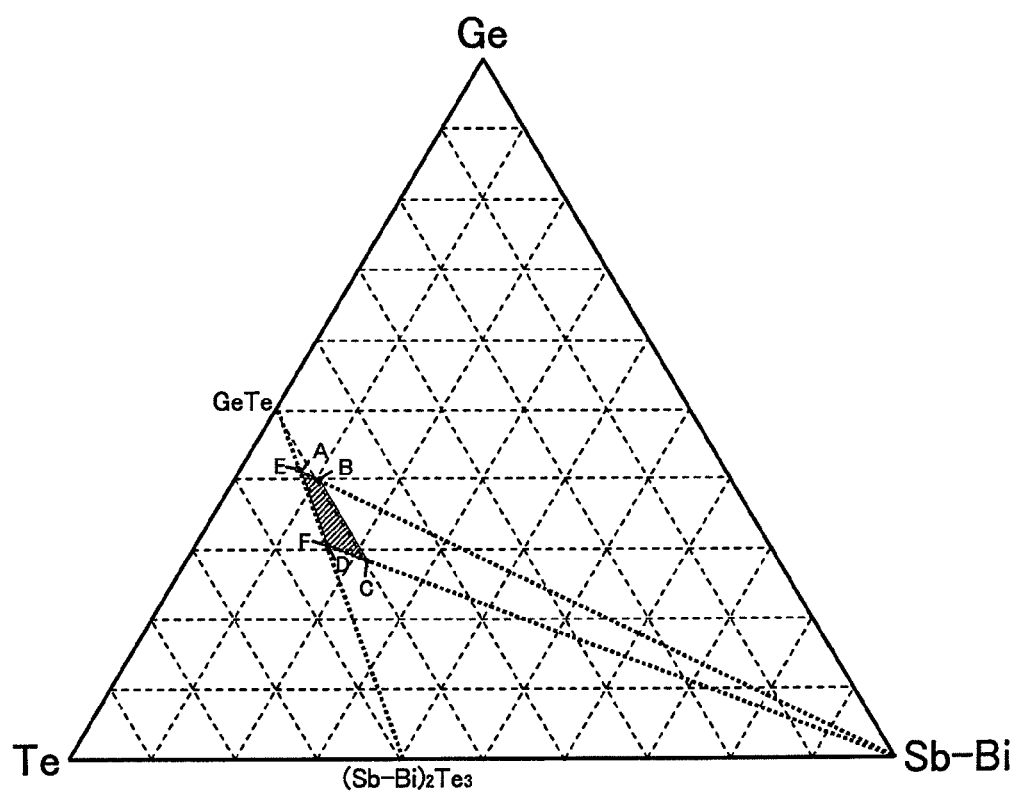
FIG. 2 is a triangular coordinate graph showing a compositional range of a Ge—Sb—Bi—Te-based material included in the recording medium which is used in an optical information recording medium of the present invention.

The upper limit of the value of GeTe/[(Sb—Bi)$_2$Te$_3$] is preferably the "E" composition in FIG. 2 (where the value of GeTe/[(Sb—Bi)$_2$Te$_3$] is twelve). When the proportion of the (Sb—Bi)$_2$Te$_3$ compound is larger than that in the "E" composition in FIG. 2, the volume change of the recording layer upon the transition from the crystal state to the amorphous state can be smaller, resulting in the recording medium having excellent cycle characteristic.

The recording layer 104 preferably consists of Ge, Sb—Bi and Te. In that case, the composition described above is the composition of the recording layer itself. The recording layer 104 may further include at least one element selected from Ag, In, Ge, Se, Sn, Al, Ti, V, Mn, Fe, Co, Cr, Ni, Cu, Zn, Ga, Bi, Si, Dy, Pd, Pt, Au, N, O, S, F, B, C and P.

These elements are impurities within a film-forming apparatus, or the impurities contained in the members for sputtering the recording layer. These impurities may be contained in the recording layer during the formation of the recording layer. In that case, when the total content of these elements is 5 atom % or less, preferably 3 atom % or less, and particularly preferably 1 atom % or less, the existence of such elements in the recording layer is permitted. When a minute amount of any of these elements is contained in the recording layer (for example, any of the elements is inevitably contained in the recording layer due to the characteristic of the film-forming apparatus), the crystallization of the recording layer can be adjusted by fine adjusting the amount of the $Bi_2Te_3$ compound and therefore the effect of the present invention is not impaired.

The second protective layer 106 is preferably formed from a material containing ZnS in an amount of 60 mol % or more. The protective layer is more preferably formed from a material containing ZnS in an amount of 70 mol % or more and further containing $SiO_2$. The protective layer of such a material can maintain balance of heat diffusion amount in the recording layer over a wide range of linear velocity, whereby excellent recording characteristic is conferred to the medium. Further, the film-forming speed can be easily made high by using ZnS as a main component. The upper limit of the content of ZnS is not limited to particular one, but the content of ZnS is preferably 90 mol % or less so that the noise of the recording medium is suppressed.

The film thickness of the second protective layer 106 is preferably 35 nm or more. The second protective layer 106 of such a thickness increases a distance between the recording layer 104 and the optical absorption layer 107 and a distance between the recording layer 104 and the reflective layer 108, to suppress the heat diffusion from the recording layer 104 heated by the laser beam and to improve the recording sensitivity of the recording medium. Further, the film thickness of the second protective layer 106 is preferably 55 nm or less. The second protective layer 106 of such a thickness increase the reflectance of the disk and make the heat to be drawn easily from the recording layer. This makes it easy to change the recording layer in crystal state to that in amorphous phase even at the time of low-speed recording, and improves the jitter characteristic of the recording medium.

The optical absorption layer 107 serves to adjust the ratio of optical absorptance of the recording layer 104 in crystal state to that of the recording layer 104 in amorphous state, and suppress the deformation of the mark shape upon overwriting. Therefore, the optical absorption layer 107 particularly contributes to the erase ratio at a high speed. Further, the optical absorption layer 107 increase a difference in reflectance between in the case where the recording layer 104 is in crystal state and in the case where the recording layer 104 is in amorphous state, and therefore excellent jitter characteristic is obtained.

The optical absorption layer 107 may be formed from a material containing at least one element selected from Ti, ZR, Hf, V, Nb, Ta, Cr, Mo, W, Mn, Os, Ga, In, C, Si, Ge, Sn, Pb, Sb and Bi. Specifically, it is preferable to use a material selected from an amorphous Ge alloy and an amorphous Si alloy such as Ge—Cr, Ge—Mo, Si—Cr, Si—Mo and Si—W, and crystalline semiconductor, semimetal and metal materials such as Ti, Zr, Nb, Ta, Cr, Mo, W, Sn, Te, Pb and Te. Among these, a material containing at least one element selected from Si and Ge is preferable and a Si-based material is particularly preferable. The Si-based material has a higher melting point than Ge, and therefore has good durability against heat, and a high thermal conductivity. For this reason, the Si-based material makes the jitter characteristic of the recording medium more excellent.

Materials for forming the reflective layer 108 include:

a metal elemental substance, such as Al, Au and Ag which has optical reflectiveness or an alloy of these metals;

an alloy which contains, as a main component, one or more metals selected from Al, Au and Ag and one or more additive elements selected from Ti, Cr, Co, Ni, Se, Ge, Zr, In, Sn, Sb, Te, Pt, Pb, Bi, Pd, Cu. Ga, Hf, La, Ce, Pr, Nd, Sm, Eu, Gd, Tb, Dy, Ho and Er; and a mixture which is obtained by mixing at least one metals selected from Al, Au and Ag with a metal compound such as a nitride, an oxide, and/or a chalcogenide of a metal, such as Al and/or Si.

The reflective layer 108 is preferably formed from Ag that has the highest thermal conductivity among the metals, or a material which contains Ag in an amount of 90% or more. As the thermal conductivity of the reflective layer is higher, the heat is more easily and rapidly drawn from the recording layer at the time of low-speed recording, whereby the amorphousization is promoted and a large mark can be written.

The recording characteristic of the recording medium at the time of high-speed recording depends on a film thickness of the reflective layer 108, rather than the thermal conductivity of the material of the layer 108. Therefore, the recording characteristic of the recording medium at the time of high-speed recording can be improved also by adjusting the film thickness of the reflective layer 108. The film thickness of the reflective layer 108 is preferably 60 nm or more and less than 140 nm, and more preferably 80 nm or more and less than 120 nm. When the film thickness of the reflective layer 108 is less than 60 nm, the recording characteristic at the time of low-speed recording tends to be deteriorated, and when it is 140 nm or more, an archival overwrite deterioration amount tends to be large.

The material and the composition of each layer of the recording medium as described above may be analyzed by an Auger electron spectroscopy, an X-ray photoelectron spectroscopy or a secondary ion mass spectrometry (see, for example, "A thin film formation Handbook" edited by Japan Society of Applied Physics/Thin Film and Surface Physics Division, published by KYORITSU SHUPPAN CO., LTD, 1991 etc.) or an X-ray microanalyzer method. The inventors analyzed, by the X-ray microanalyzer method, the recording layer and the other layers formed as thin films by sputtering, and confirmed that the result of the analysis was almost the same as the nominal composition of the sputtering target.

However, the composition of the sputtering target may be different from the composition of the thin film actually formed in some film-forming apparatuses, some film-forming conditions and some methods for manufacturing the target. In that case, it is preferable to previously determine, from experimental rule, a correction coefficient for correcting the deviation of the composition, and to select the target material composition so that the film of a desired composition is obtained.

The optical information recording medium shown in FIG. 1 has a constitution wherein the first protective layer 102, the first interface layer 103, the recording layer 104, the second interface layer 105, the second protective layer 106, the optical absorption layer 107 and the reflective layer 108 are provided. The effect of the present invention can be achieved in a recording medium wherein the first protective layer 102, the recording layer 104, the second protective layer 105, and the reflective layer 108 are provided and the first and the second interface layers and the optical absorption layer 107 are not provided. The number of the layers may be further decreased if necessary.

The each layer (the thin film) described above may be formed by a gas-phase thin film deposition method, such as a vacuum deposition method, a sputtering method, an ion plating method, a CVD (Chemical Vapor Deposition) method, or an MBE method (Molecular Beam Epitaxy) method.

The adhesive layer and the protective substrate which are not shown in the figure are formed by a conventional method. The adhesive layer is formed by, for example, a method wherein an ultraviolet curable resin is spincoated. The protective substrate is a disc-shaped substrate formed from the material described in connection with the transparent substrate 101, and is preferably formed from polycarbonate.

The optical information recording medium of the present invention is useful as a DVD-RAM on or from which information is recorded or reproduced with a laser beam having a wavelength of about 660 nm, or a BD-RE on or from which information is recorded or reproduced with a laser beam having a wavelength of about 405 nm. When the optical information recording medium of the present invention is produced as the BD-RE, it can be produced by a method wherein at least the reflective layer, the second protective layer, the recording layer and the first protective layer are formed in this order on the transparent substrate, and a thin and transparent sheet (for example, of a thickness of 90 μm to 100 μm) is bonded by means of the adhesive layer (the ultraviolet curable resin). Further, the optical information recording medium of the present invention may be embodied as a multi-layer information recording medium which has a plurality of recording layers. In that case, one or more recording layers may be formed from the Ge—Sb—Bi—Te-based material of the particular composition as described above, or all the recording layers may be formed from the Ge—Sb—Bi—Te-based material of the particular composition as described above.

EXAMPLES

The present invention is described more specifically by examples hereinafter, but the following examples do not limit the present invention.

Example 1

In Example 1, an optical information recording medium of a construction shown in FIG. 1 was manufactured.

A substrate of polycarbonate which has a diameter of 12 cm, a thickness of 0.6 mm, a groove pitch of 1.23 μm, a groove depth of about 55 nm was prepared as a transparent substrate. On the surface of the substrate where the groove was formed, a first protective layer of $(ZnS)_{80}(SiO_2)_{20}$ having a film thickness of 134 nm, a first interface layer of $(ZrO_2)_{46}(Y_2O_3)_4(Cr_2O_3)_{50}$ having a film thickness of 2 nm, a recording layer having a film thickness of 8 nm, a first interface layer of $(ZrO_2)_{46}(Y_2O_3)_4(Cr_2O_3)_{50}$ having a film thickness of 2 nm, a second protective layer of $(ZnS)_{80}(SiO_2)_{20}$ having a film thickness of 45 nm, an optical absorption layer of $CrSi_2$ having a film thickness of 30 nm, and a reflective layer of $Ag_{98}In_2$ having a film thickness of 100 nm were formed in this order, by a sputtering method. The recording layer was formed from a composition which was obtained by adding Sb in an amount of 2 atom % to a composition in which the mol ratio of GeTe compound to (Sb—Bi)$_2$Te$_3$ compound; GeTe/ [(Sb—Bi)$_2$Te$_3$] was 8 and a content of Bi was 7 atom %.

Figure 3:
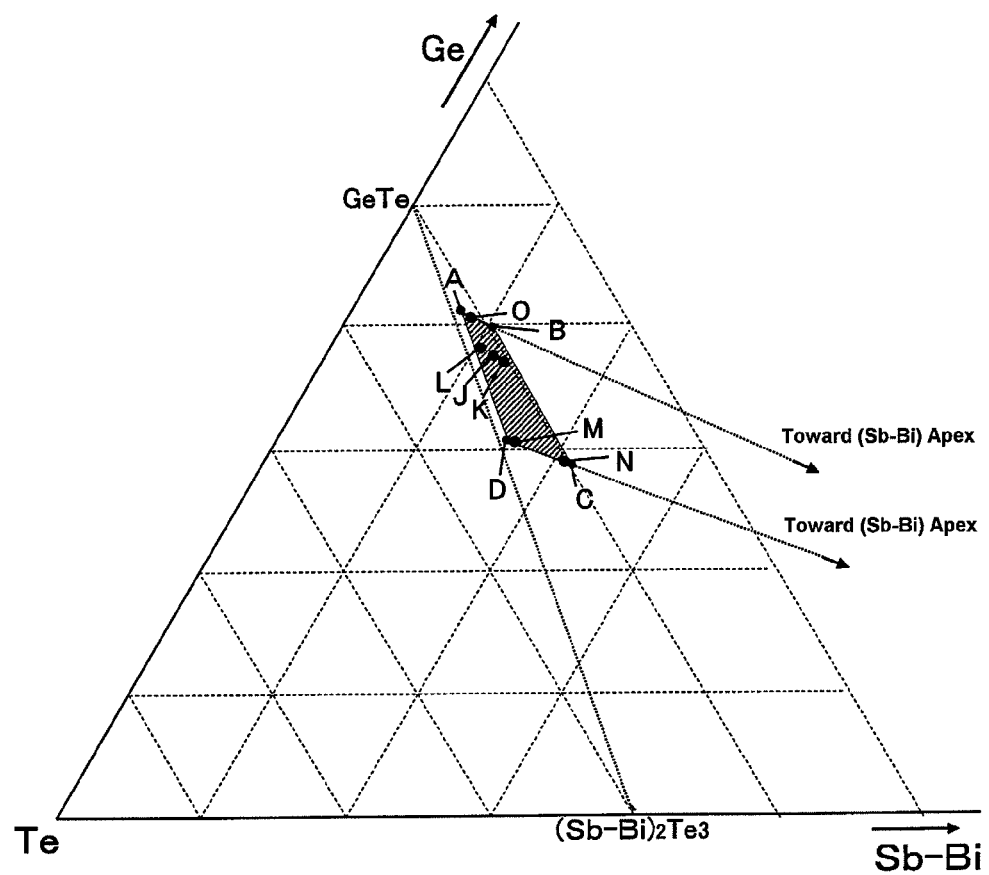
FIG. 3 is a triangular coordinate graph showing compositions of recording layers in the mediums of Examples 1 to 6 of the present invention.

The composition of the recording layer was determined by forming a sample for analysis separately from the recording medium, and analyzing it by an X-ray microanlyzer method. As a result, the compositional ratio of the respective elements was Ge; 37.3 atom %, Sb; 4.4 atom %, Te; 51.4 atom %, Bi; 6.9 atom % (Sb—Bi; 11.3 atom %) The compositional ratio of this composition is shown as "J" in a triangular coordinate graph shown in FIG. 3.

A cluster type (or sheet-fed) sputtering apparatus was used as a film-forming apparatus for forming the respective layers. The substrate was fully dried by being annealed in environment at 70° C. Then, the substrate was transferred sequentially to film-forming chambers provided with targets and each layer was formed as the thin film. Only Ar was used as a sputtering gas during the formation of each layer.

The protective substrate (thickness of about 0.6 mm) was bonded to a surface of the multi-layered thin films by means of an ultraviolet curable resin, and the resin was cured by applying a ultraviolet ray to the resin. Further, the entire of the recording layer was initialized by applying the laser beam to the medium on the side of the transparent substrate.

The reflectance of the initialized medium was determined by applying the laser beam having a wavelength of 660 nm to a mirror portion where the groove is not formed. The medium was evaluated as "⊚" when the reflectance is 16.5% or more. The medium was evaluated as "○" when the reflectance was 15.5% or more and less than 16.5%. The medium was evaluated as "Δ" when the reflectance was 14.5% or more and less than 15.5% . The medium was evaluated as "X" when the reflectance was less than 14.5%.

Next, a method for recording a signal on, erasing the signal from, or overwriting the signal on the optical information recording medium is described. In this example, the recording medium was rotated at three different conditions, that is, at linear velocities of 8.2 m/s (reference clock T=17.1 ns), 12.3 m/s (reference clock T=12.0 ns), and 20.5 m/s (reference clock T=6.9 ns), using an optical system with a wavelength of 660 nm and NA=0.6.

The recording of signal was conducted modulating the laser beam so that the shortest recording code length was 3 T and the longest recording code length was 11 T. At any speed, the modulated waveforms were a single rectangular pulse of a 1.5 T width (power level P1) for the 3 t signal, and a pulse train in which a head pulse was of a 1.5 T width and (N-3) subpulses following the head pulse were of 0.5 T width for a NT signal (N=4 to 11) (power level P1), and the width between the respective adjacent pulse was also 0.5 T (power level P3. The portion where the mark was not recorded was irradiated with a continuous light having a power level P2. In case of linear velocity of 8.2 m/s, P3 was P2; in case of linear velocity of 12.3 m/w, P3 was P2; in case of linear velocity of 20.5 m/s, P3 was P2.

In order to determine each power level, signals wherein the recording pulses of from 3 T to 11 T were randomly generated were overwritten ten times on both of the land track and the groove track in the medium, and then each power level was determined so that the jitter value (a mean value of the leading edge jitter and the trailing edge jitter) of a reproduced signal is minimized. The positions of the leading edge and the trailing edge of each recording pulse were adjusted optionally during this determination. The reproduction of signal was conducted at a linear velocity of 8.2 m/s with a reproducing power of 1.0 mW for any signal recorded at any linear velocity.

Here, the lower power level P1 (the recording sensitivity) is preferable since the thermal load applied to the thin film is suppressed. As the recording speed is lower, this tendency is more remarkable. In this example, the recording sensitivities of the land and the groove were determined at a linear velocity of 8.2 m/s. A higher power of the two recording sensitivities was determined as the recording sensitivity of the medium. The medium was evaluated as "⊚" when the recording sensitivity was less than 11 mW, the medium was evaluated as "○" when the recording sensitivity was 11 mW or more and less than 12 mW, the medium was evaluated as "Δ" when the recording sensitivity was 12 mW or more and less than 13 mW, and the recording medium was evaluated as "X" when the recording sensitivity was 13 mW or more.

The evaluation of the jitter was conducted by evaluating a cross-erase jitter (CE jitter). The jitter on the central track was evaluated after random signals were recorded on successive five recording tracks ten times. The recording was made by recording the signal on any track using the power levels determined previously, and then overwriting the signals 10 times on the two tracks adjacent to the any track and on the outer and the inner tracks of the two tracks. After the recording, the jitter on the central track was evaluated.

The CE jitters were determined for both of the groove and the land and a mean value of them was determined. The medium evaluation was evaluated as "⊚" when the mean value was less than 8.5%. The medium was evaluated as "○" when the value was 8.5% or more and less than 9.0%. The medium was evaluated as "Δ" when the value was 9.0% or more and less than 9.5%. The medium was evaluated as "X" when the value was 9.5% or more.

The life time of qualiity of the recording mark was examined for the purpose of examining the stability of the recorded signal, by carrying out an accelerated test wherein the medium was put into a high-temperature and high-humid environment of 80° C. and 80% for 50 hours after the recording was made at the respective linear velocities. It is known that the temporal quality of the recording mark has a close relationship with the crystallization speed of the recording layer. For example, when the crystallization speed of the recording layer is too high, the crystal growth of the recording mark (amorphous portion) is promoted with time, and the recording mark tends to become small. As a result, the quality of the recording mark is easily deteriorated (archival deterioration). In particular, as the recording speed is lower, the heat tends to be confined in the recording layer, and thereby a large crystal tends to be formed around the recording mark. This large crystal further promotes the crystallization, whereby the archival deterioration tends to occur. In other words, the recording mark recorded at a low linear velocity tends to cause the archival deterioration when the crystallization speed of the recording layer is too high.

To the contrary, when the crystallization speed of the recording layer is too low, the recording mark (in amorphous state) tends to be stable with time. For this reason, the recording mark is difficult to be erased, and the quality of the recording mark formed by overwriting becomes bad (archival overwrite deterioration). In particular, as the recording speed is higher, the heat tends to diffuse more rapidly in the recording layer, and thereby more stable recording mark tends to be formed, resulting in remarkable archival overwrite deterioration. In other words, the recording mark recorded at a high linear velocity tends to cause the archival overwrite deterioration.

In this example, the medium was rotated at a linear velocity of 8.2 m/s and a linear velocity of 20.5 m/s and the information was recorded on both of the land and the groove tracks at the respective linear velocities followed by determining the jitter (the leading edge and the trailing edge). Then, the medium was left in the environment of 80° C. and 85% for 50 hours. After the acceleration test, the jitter was determined again on the track where the recording was made at the linear velocity of 8.2 m/s, and the difference in jitter between before and after the acceleration test (an archival deterioration amount) was calculated. Further, overwrite recording was made once on the track where the recording was made at the linear velocity of 20.5 m/s followed by determining the jitter, and the difference between the this jitter and the jitter determined before the acceleration test (an archival overwrite deterioration amount) was calculated.

The archival deterioration amount and the archival overwrite (O/W) deterioration amount were determined in this manner, and the worst value was selected from the deterioration amount of the leading and trailing edge jitters for the land track, the groove track. The medium was evaluated as "⊚" when the worst value was 1.0% or less. The medium was evaluated as "○" when the worst value was 1.0% or more and less than 2.0%. The medium was evaluated as "Δ" when the worst value was 2.0% or more and less than 3.0%. The medium was evaluated as "X" when the worst value was 3.0% or more.

For the medium of Example 1, the reflectance, and the recording sensitivity, CE10, the cycle characteristic, and the archival deterioration amount at a linear velocity of 8.2 m/s, and CE10, the cycle characteristic at a linear velocity of 12.3 m/s, and CE10, the cycle characteristic, the archival overwrite O/W deterioration amount at a linear velocity of 20.5 m/s were determined by the procedures as described above.

In each evaluation, "⊚" is most preferable result, "○" is more preferable, "Δ" is preferable, and "X" is not preferable. The medium which was not evaluated as "X" in any of the evaluation items is defined as a preferable medium and evaluated as "○" for total evaluation. On the other hand, the medium which was evaluated as "X" in one or more evaluation items is defined as a not-preferable medium and evaluated as "X" for the total evaluation. In the following Table 1, the meaning of each symbol used for evaluating each characteristic was shown.

Example 2

The recording medium was manufactured by the same method as employed in Example 1 except for forming the recording layer from a composition which was obtained by adding Sb in an amount of 4.0 atom % to a composition in which the mol ratio of GeTe compound to $(Sb-Bi)_2Te_3$ compound; $GeTe/[(Sb-Bi)_2Te_3]$ was 8 and a content of Bi was 9.0 atom %. The composition of the recording layer determined by the X-ray microanlyzer method was Ge; 36.6 atom %, Sb; 4.3 atom %, Te; 50.4 atom %, Bi; 8.7 atom % (Sb—Bi; 13.0 atom %). The composition of this recording layer is shown as "K" in the triangular coordinate graph shown in FIG. 3.

The results of the evaluation of the recording medium of Example 2 are shown in Table 2. The recording medium of Example 2 was evaluated as "○" or better for all the evaluation items, and the total evaluation thereof was "○."

Example 3

The recording medium was manufactured by the same method as employed in Example 1 except for forming the recording layer from a composition which was obtained by adding Sb in an amount of 1 atom % to a composition in which the mol ratio of GeTe compound to $(Sb-Bi)_2Te_3$ compound; $GeTe/[(Sb-Bi)_2Te_3]$ was 8 and a content of Bi was 6 atom %. The composition of the recording layer determined by the X-ray microanlyzer method was Ge; 37.7 atom %, Sb; 4.5 atom %, Te; 51.9 atom %, Bi; 5.9 atom % (Sb—Bi; 10.4 atom %). The composition of this recording layer is shown as "L" in the triangular coordinate graph shown in FIG. 3.

The results of the evaluation of the recording medium of Example 3 are shown in Table 2. The recording medium of Example 3 was evaluated as "Δ" or better for all the evaluation items, and the total evaluation thereof was "○."

Example 4

The recording medium was manufactured by the same method as employed in Example 1 except for forming the recording layer from a composition which was obtained by adding Sb in an amount of 2 atom % to a composition in which

TABLE 1

| Determination | Characteristic at 8.2 m/s | | | Characteristics at 8.2 m/s, 12.3 m/s and 20.5 m/s | | Characteristic at 20.5 m/s |
|---|---|---|---|---|---|---|
| | Reflectance | Recording Sensitivity | Archival Deterioration amount | CE10 | Cycle Characteristic | Archival O/W Deterioration Amount |
| ⊚ | ≧16.5% | <11.0 mW | <1.0% | <8.5% | ≧100,000 | <1.0% |
| ○ | ≧15.5% and <16.5% | ≧11.0 mw and <12.0 mW | ≧1.0% and <2.0% | ≧8.5% and <9.0% | ≧30,000 and <100,000 | ≧1.0% and <2.0% |
| Δ | ≧14.5% and <15.5% | ≧12.0 mW and <13.0 mW | ≧2.0% and <3.0% | ≧9.0% and <9.5% | ≧10,000 and <30,000 | ≧2.0% and <3.0% |
| X | <14.5% | ≧13.0 mW | ≧3.0% | ≧9.5% | <10,000 | ≧3.0% |

The results of the evaluation of Example 1 are shown in Table 2. In this table, the molar ratio of GeTe to $(Sb-Bi)_2Te_3$, the content of Bi in the composition before adding Sb, the additive amount of Sb, and the contents of Ge, Sb, Te and Bi of the recording layer are also shown. The recording medium of Example 1 was evaluated as "⊚" for all the evaluation items, and the total evaluation thereof was "○."

the mol ratio of GeTe compound to $(Sb-Bi)_2Te_3$ compound; $GeTe/[(Sb-Bi)_2Te_3]$ was 4 and a content of Bi was 7 atom %. The composition of the recording layer determined by the X-ray microanlyzer method was Ge; 30.2 atom %, Sb; 10.2 atom %, Te; 52.7 atom %, Bi; 6.9 atom % (Sb—Bi; 17.1 atom %). The composition of this recording layer is shown as "M" in the triangular coordinate graph shown in FIG. 3.

The results of the evaluation of the recording medium of Example 4 are shown in Table 2. The recording medium of Example 4 was evaluated as "Δ" or better for all the evaluation items, and the total evaluation thereof was "○."

Example 5

The recording medium was manufactured by the same method as employed in Example 1 except for forming the recording layer from a composition which was obtained by adding Sb in an amount of 7 atom % to a composition in which the mol ratio of GeTe compound to $(Sb-Bi)_2Te_3$ compound; GeTe/$[(Sb-Bi)_2Te_3]$ was 4 and a content of Bi was 12 atom %. The composition of the recording layer determined by the X-ray microanlyzer method was Ge; 28.8 atom %, Sb; 9.7 atom %, Te; 50.3 atom %, Bi; 11.2 atom % (Sb—Bi; 20.9 atom %). The composition of this recording layer is shown as "N" in the triangular coordinate graph shown in FIG. 3.

The results of the evaluation of the recording medium of Example 5 are shown in Table 2. The recording medium of Example 5 was evaluated as "Δ" or better for all the evaluation items, and the total evaluation thereof was "○."

Example 6

The recording medium was manufactured by the same method as employed in Example 1 except for forming the recording layer from a composition which was obtained by adding Sb in an amount of 1.5 atom % to a composition in which the mol ratio of GeTe compound to $(Sb-Bi)_2Te_3$ compound; GeTe/$[(Sb-Bi)_2Te_3]$ was 12 and a content of Bi was 6.5 atom %. The composition of the recording layer determined by the X-ray microanlyzer method was Ge; 40.8 atom %, Sb; 1.9 atom %, Te; 50.9 atom %, Bi; 6.4 atom % (Sb—Bi; 8.3 atom %). The composition of this recording layer is shown as "O" in the triangular coordinate graph shown in FIG. 3.

The results of the evaluation of the recording medium of Example 6 are shown in Table 2. The recording medium of Example 6 was evaluated as "Δ" or better for all the evaluation items, and the total evaluation thereof was "○."

Comparative Example 1

Figure 4:
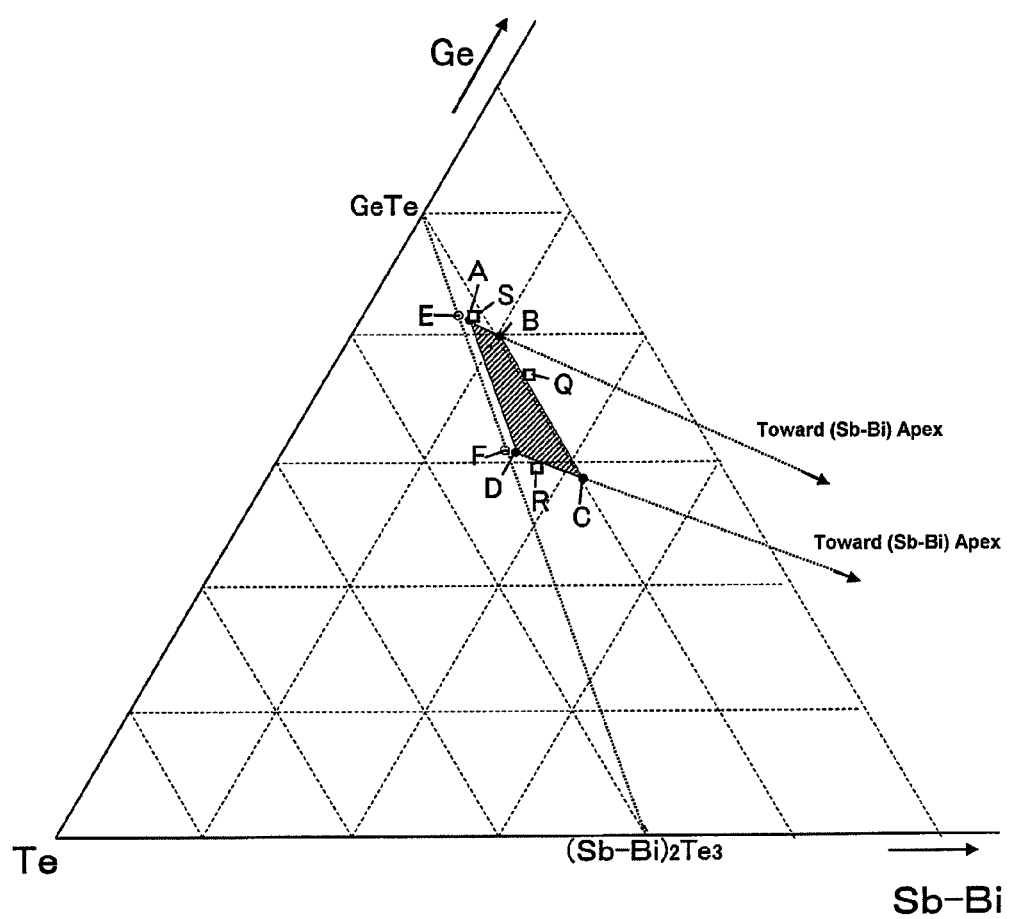
FIG. 4 is a triangular coordinate graph showing compositions of the recording layers in the medium of Comparative Examples 1 to 4.

The recording medium was manufactured by the same method as employed in Example 1 except for forming the recording layer from a composition which was obtained by adding Sb in an amount of 6 atom % to a composition in which the mol ratio of GeTe compound to $(Sb-Bi)_2Te_3$ compound; GeTe/$[(Sb-Bi)_2Te_3]$ was 8 and a content of Bi was 9 atom %. The composition of the recording layer determined by the X-ray microanlyzer method was Ge; 35.9 atom %, Sb; 6.2 atom %, Te; 49.4 atom %, Bi; 8.5 atom % (Sb—Bi; 14.7 atom %). The composition of this recording layer is shown as "Q" in a triangular coordinate graph shown in FIG. 4.

The results of the evaluation of the medium of Comparative Example 1 are shown in Table 2. The recording medium of Comparative Example 1 was evaluated as "X" for the archival O/W, and the total evaluation thereof was "X."

Comparative Example 2

The recording medium was manufactured by the same method as employed in Example 1 except for forming the recording layer from a composition which was obtained by adding Sb in an amount of 2 atom % to a composition in which the mol ratio of GeTe compound to $(Sb-Bi)_2Te_3$ compound; GeTe/$[(Sb-Bi)_2Te_3]$ was 3.8 and a content of Bi was 7 atom %. The composition of the recording layer determined by the X-ray microanlyzer method was Ge; 29.6 atom %, Sb; 10.7 atom %, Te; 52.8 atom %, Bi; 6.9 atom % (Sb—Bi; 17.6 atom %). The composition of this recording layer is shown as "R" in the triangular coordinate graph shown in FIG. 4.

The results of the evaluation of the medium of Comparative Example 2 are shown in Table 2. The recording medium of Comparative Example 2 was evaluated as "X" for the reflectance, and the total evaluation thereof was "X."

Comparative Example 3

The recording medium was manufactured by the same method as employed in Example 1 except for forming the recording layer from a composition which was obtained by adding Sb in an amount of 1 atom % to a composition in which the mol ratio of GeTe compound to $(Sb-Bi)_2Te_3$ compound; GeTe/$[(Sb-Bi)_2Te_3]$ was 13 and a content of Bi was 6 atom %. The composition of the recording layer determined by the X-ray microanlyzer method was Ge; 41.5 atom %, Sb; 1.4 atom %, Te; 51.2 atom %, Bi; 5.9 atom % (Sb—Bi; 17.3 atom %). The composition of this recording layer is shown as "S" in the triangular coordinate graph shown in FIG. 4.

The results of the evaluation of the medium of Comparative Example 3 are shown in Table 2. The recording medium was evaluated as "X" for CE10 at the linear velocity of 8.2 m/s and the cycle characteristic at every linear velocity, and the total evaluation thereof was "X."

TABLE 2

| | Composition before Sb Addition | | | Composition of Recording Layer (atom %) | | | | |
| --- | --- | --- | --- | --- | --- | --- | --- | --- |
| | Mol Ratio of GeTe:$(Sb-Bi)_2Te_3$ | Cont. of Bi (atom %) | Additive Amount of Sb (atom %) | Ge | Sb | Te | Bi | Reflectance |
| Example 1 | 8:1 | 7 | 2 | 37.3 | 4.4 | 51.4 | 6.9 | ◎ |
| Example 2 | 8:1 | 9 | 4 | 36.6 | 4.3 | 50.4 | 8.7 | ○ |
| Example 3 | 8:1 | 6 | 1 | 37.7 | 4.5 | 51.9 | 5.9 | ○ |
| Example 4 | 4:1 | 7 | 2 | 30.2 | 10.2 | 52.7 | 6.9 | Δ |
| Example 5 | 4:1 | 12 | 7 | 28.8 | 9.7 | 50.3 | 11.2 | Δ |
| Example 6 | 12:1 | 6.5 | 1.5 | 40.8 | 1.9 | 50.9 | 6.4 | ◎ |
| Comparative Example 1 | 8:1 | 9 | 6 | 35.9 | 6.2 | 49.4 | 8.5 | Δ |
| Comparative Example 2 | 3.8:1 | 7 | 2 | 29.6 | 10.7 | 52.8 | 6.9 | X |
| Comparative Example 3 | 13:1 | 6 | 1 | 41.5 | 1.4 | 51.2 | 5.9 | ◎ |

TABLE 2-continued

|  | Characteristic at 8.2 m/s | | | | Characteristic at 12.3 m/s | | Characteristic at 20.5 m/s | | | Total Evaluation |
| --- | --- | --- | --- | --- | --- | --- | --- | --- | --- | --- |
|  | Recording sensitivity | CE10 | Cycle | Archival | CE10 | Cycle | CE10 | Cycle | Archival O/W | |
| Example 1 | ◎ | ◎ | ◎ | ◎ | ◎ | ◎ | ◎ | ◎ | ◎ | ○ |
| Example 2 | ◎ | ○ | ◎ | ◎ | ○ | ◎ | ◎ | ◎ | ○ | ○ |
| Example 3 | ◎ | ○ | ○ | ○ | ○ | ○ | ◎ | ◎ | Δ | ○ |
| Example 4 | ○ | Δ | ◎ | ○ | Δ | ◎ | ○ | ◎ | Δ | ○ |
| Example 5 | ○ | Δ | ○ | ○ | Δ | ○ | ○ | ○ | ○ | ○ |
| Example 6 | ◎ | ○ | Δ | ◎ | ○ | Δ | ○ | Δ | Δ | ○ |
| Comparative Example 1 | ◎ | ◎ | ◎ | ◎ | ○ | ◎ | Δ | Δ | X | X |
| Comparative Example 2 | ○ | Δ | ◎ | ○ | Δ | ◎ | ○ | ◎ | Δ | X |
| Comparative Example 3 | ○ | X | X | Δ | Δ | X | ◎ | X | ◎ | X |

As shown in the above, the recording medium was able to be obtained which was of a practical level of any of the reflectance, and the recording sensitivity, CE10, the cycle characteristic, and the archival deterioration amount at a linear velocity of 8.2 m/s, and CE10, the cycle characteristic, and the archival overwrite (O/W) deterioration amount at a linear velocity of 20.5 m/s, when the composition of the recording layer was within a region bounded by the respective composition points A(Ge$_{41.2}$, (Sb—Bi)$_{7.4}$, Te$_{51.4}$), B(Ge$_{39.8}$, (Sb—Bi)$_{10.5}$, Te$_{49.7}$), C(Ge$_{28.5}$, (Sb—Bi)$_{21.7}$, Te$_{49.8}$), and D(Ge$_{30.6}$, (Sb—Bi)$_{15.8}$, Te$_{53.6}$) in a triangular coordinate graph whose apices are Ge, Sb—Bi and Te, and the content of Bi contained in the recording layer was 4 atom % or more and less than 13 atom %.

The mediums of Examples 9 to 11 and Comparative Examples 4 and 5 were manufactured and evaluated for the purpose of examining the effect of the Bi content on the characteristic of the recording medium.

Comparative Example 4

The recording medium was manufactured by the same method as employed in Example 1 except for forming the recording layer from a composition in which the mol ratio of GeTe compound to (Sb—Bi)$_2$Te$_3$ compound; GeTe/[(Sb—Bi)$_2$Te$_3$] was 12 and a content of Bi was 3.5 atom %. The composition of the recording layer determined by the X-ray microanlyzer method was Ge; 41.4 atom %, Sb; 3.4 atom %, Te; 51.7 atom %, Bi; 3.5 atom % (Sb—Bi; 6.9 atom %).

The results of the evaluation of the medium of Comparative Example 4 are shown in Table 3. The recording medium was evaluated as "X" for CE10, the cycle characteristic, and the archival O/W at the linear velocity of 20.5 m/s, and the total evaluation thereof was "X."

Example 7

The recording medium was manufactured by the same method as employed in Example 1 except for forming the recording layer from a composition which was obtained by adding Sb in an amount of 0.5 atom % to a composition in which the mol ratio of GeTe compound to (Sb—Bi)$_2$Te$_3$ compound; GeTe/[(Sb—Bi)$_2$Te$_3$] was 12 and a content of Bi was 4.5 atom %. The composition of the recording layer determined by the X-ray microanlyzer method was Ge; 41.2 atom %, Sb; 2.9 atom %, Te; 51.4 atom %, Bi; 4.5 atom % (Sb—Bi; 7.4 atom %).

The results of the evaluation of Example 7 are shown in Table 3. The recording medium was evaluated as "Δ" or better for all the evaluation items, and the total evaluation thereof was "○."

Example 8

The recording medium was manufactured by the same method as employed in Example 1 except for forming the recording layer from a composition which was obtained by adding Sb in an amount of 0.5 atom % to a composition in which the mol ratio of GeTe compound to (Sb—Bi)$_2$Te$_3$ compound; GeTe/[(Sb—Bi)$_2$Te$_3$] was 12 and a content of Bi was 5.5 atom %. The composition of the recording layer determined by the X-ray microanlyzer method was Ge; 41.2 atom %, Sb; 1.9 atom %, Te; 51.4 atom %, Bi; 5.5 atom % (Sb—Bi; 7.4 atom %).

The results of the evaluation of the medium of Example 8 are shown in Table 3. The recording medium was evaluated as "Δ" or better for all the evaluation items, and the total evaluation thereof was "○."

Example 9

The recording medium was manufactured by the same method as employed in Example 1 except for forming the recording medium from a composition which was obtained by adding Sb in an amount of 6 atom % to a composition in which the mol ratio of GeTe compound to (Sb—Bi)$_2$Te$_3$ compound; GeTe/[(Sb—Bi)$_2$Te$_3$] was 4 and a content of Bi was 11 atom %. The composition of the recording layer determined by the X-ray microanlyzer method was Ge; 29.0 atom %, Sb; 9.8 atom %, Te; 50.8 atom %, Bi; 10.4 atom % (Sb—Bi; 20.2 atom %).

The results of the evaluation of the recording medium of Example 9 are shown in Table 3. The recording medium of Example 9 was evaluated as "Δ" or better for all the evaluation items, and the total evaluation thereof was "○."

Comparative Example 5

The recording medium was manufactured by the same method as employed in Example 1 except for forming the recording layer from a composition which was obtained by adding Sb in an amount of 8 atom % to a composition in which the mol ratio of GeTe compound to (Sb—Bi)$_2$Te$_3$ compound; GeTe/[(Sb—Bi)$_2$Te$_3$] was 4 and a content of Bi was 13 atom %. The composition of the recording layer determined by the X-ray microanlyzer method was Ge; 28.5 atom %, Sb; 8.2 atom %, Te; 49.9 atom %, Bi; 13.4 atom % (Sb—Bi; 21.6 atom %).

The results of the evaluation of the medium of Comparative Example 5 are shown in Table 3. The recording medium was evaluated as "X" for CE10 and the cycle characteristic at linear velocities of 8.2 m/s and 12.3 m/s, and the total evaluation thereof was "X."

TABLE 3

| | Composition before Sb Addition | | | Composition of Recording Layer (atom %) | | | | |
|---|---|---|---|---|---|---|---|---|
| | Mol Ratio of GeTe:(Sb—Bi)$_2$Te$_3$ | Cont. of Bi (atom %) | Additive Amount of Sb (atom %) | Ge | Sb | Te | Bi | Reflectance |
| Comparative Example 4 | 12:1 | 3.5 | 0 | 41.4 | 3.4 | 51.7 | 3.5 | ◉ |
| Example 7 | 12:1 | 4.5 | 0.5 | 41.2 | 2.9 | 51.4 | 4.5 | ◉ |
| Example 8 | 12:1 | 5.5 | 0.5 | 41.2 | 1.9 | 51.4 | 5.5 | ◉ |
| Example 6 | 12:1 | 6.5 | 1.5 | 40.8 | 1.9 | 50.9 | 6.4 | ◉ |
| Example 4 | 4:1 | 7 | 2 | 30.2 | 10.2 | 52.7 | 6.9 | Δ |
| Example 11 | 4:1 | 11 | 6 | 29.0 | 9.8 | 50.8 | 10.4 | Δ |
| Example 5 | 4:1 | 12 | 7 | 28.8 | 9.7 | 50.3 | 11.2 | Δ |
| Comparative Example 5 | 4:1 | 13 | 8 | 28.5 | 8.2 | 49.9 | 13.4 | Δ |

| | Characteristic at 8.2 m/s | | | | Characteristic at 12.3 m/s | | Characteristic at 20.5 m/s | | | Total Evaluation |
|---|---|---|---|---|---|---|---|---|---|---|
| | Recording sensitivity | CE10 | Cycle | Archival | CE10 | Cycle | CE10 | Cycle | Archival O/W | |
| Comparative Example 4 | ○ | ○ | ○ | ◉ | Δ | Δ | X | X | X | X |
| Example 7 | ○ | ○ | Δ | ◉ | Δ | Δ | ○ | Δ | Δ | ○ |
| Example 8 | ◉ | ○ | Δ | ◉ | ○ | Δ | ○ | Δ | Δ | ○ |
| Example 6 | ◉ | ○ | Δ | ◉ | ○ | Δ | ○ | Δ | Δ | ○ |
| Example 4 | ○ | Δ | ◉ | ○ | Δ | ◉ | ○ | ◉ | Δ | ○ |
| Example 11 | ○ | Δ | ◉ | ○ | Δ | ◉ | ○ | ◉ | ○ | ○ |
| Example 5 | ○ | Δ | ○ | ○ | Δ | ○ | ○ | ○ | ○ | ○ |
| Comparative Example 5 | Δ | X | X | Δ | X | X | Δ | Δ | Δ | X |

In Table 3, the evaluation results of Examples 6, 4 and 5 are shown again for reference. From Table 3, it is found that when the content of Bi is less than 4 atom %, the medium is not suitable for the high-speed recording, and when the content of Bi is over 13 atom %, the medium is not suitable for the low-speed recording. Further, it is found that when the content of Bi is 5 atom % or more and less than 12 atom %, the number of "◉" or "○" is increased.

The recording mediums of Examples 10 and 11 and Comparative Example 6 were manufactured and evaluated for the purpose of examining the effect of the composition of the first interface layer on the characteristic of the recording medium.

Example 10

The recording medium was manufactured by the same method as employed in Example 1 except that the composition of the first interface layer was $(ZrO_2)_{25}(SiO_2)_{25}(Cr_2O_3)_{50}$. The results of the evaluation of the medium of Example 10 are shown in Table 4. The medium was evaluated as "◉" for all the evaluation items and the total evaluation thereof was "○."

Example 11

The recording medium was manufactured by the same method as employed in Example 1 except that the composition of the first interface layer was $(ZrO_2)_{50}(Cr_2O_3)_{50}$. The results of the evaluation of the medium of Example 11 are shown in Table 4. The medium was evaluated as "◉" for all the evaluation items and the total evaluation thereof was "○."

Example 12

The recording medium was manufactured by the same method as employed in Example 1 except that the composition of the first interface layer was Ge—N (Ge; 55 atom %, and N; 45 atom %). The results of the evaluation of the medium of Example 12 are shown in Table 4. The total evaluation of the medium was "○", but the number of "Δ" was large, and the characteristic thereof was lower compared with those of Examples 12 and 13.

TABLE 4

| | | Characteristic at 8.2 m/s | | | | | Characteristic at 12.3 m/s | | Characteristic at 20.5 m/s | | | Total Evaluation |
|---|---|---|---|---|---|---|---|---|---|---|---|---|
| | Reflectance | Recording Sensitivity | CE10 | Cycle | Archival | CE10 | Cycle | CE10 | Cycle | Archival O/W | |
| Example 1 | ◉ | ◉ | ◉ | ◉ | ◉ | ◉ | ◉ | ◉ | ◉ | ◉ | ○ |
| Example 10 | ◉ | ◉ | ◉ | ◉ | ◉ | ◉ | ◉ | ◉ | ◉ | ◉ | ○ |
| Example 11 | ◉ | ◉ | ◉ | ◉ | ◉ | ◉ | ◉ | ◉ | ◉ | ◉ | ○ |
| Comparative Example 12 | ◉ | ◉ | ○ | ○ | ○ | ○ | ○ | Δ | Δ | Δ | ○ |

In Table 3, the results of the evaluation of Example 1 are shown again for reference. Although the compositions of the recording layer in Examples 1, 10, 12 and 13 were all the same, there is difference in recording characteristic among them since the compositions of the first interface layer were different. This means that the composition of the first interface affects the recording characteristic. Further, from Table 4, it is found that it is preferable that the first interface layer which is provided in contact with the Ge—Sb—Bi—Te-based material layer used in the present invention, contains a Zr oxide.

INDUSTRIAL APPLICABILITY

The optical information recording medium of the present invention is excellent in the long-term archival characteristic of the recorded signal and the high-speed overwrite characteristic, by employing the particular composition for the Ge—Sb—Bi—Te-based material contained in the recording layer. The optical information recording medium is useful as a DVD-RAM and an overwritable BD-RE.

The invention claimed is:

1. An optical information recording medium including a transparent substrate, a recording layer can change in phase reversibly by irradiation of a laser beam, a first protective layer (excluding one containing a Mg compound), a second protective layer (excluding one containing a Mg compound) and a reflective layer in which the first protective layer, the recording layer, the second protective layer and the reflective layer are provided in this order from a side nearer to a plane of incidence of the laser beam, wherein;

either or both of a first interface layer and a second interface layer, the first interface being disposed between the first protective layer and the recording layer and the second interface layer being disposed between the second protective layer and the recording layer;

the recording layer comprises a Ge—Sb—Bi—Te-based material consisting of Ge, Sb, Bi and Te;

the Ge—Sb—Bi—Te-based material consists of a GeTe compound, a $Sb_2Te_3$ compound and a $Bi_2Te_3$ compound and has a composition which is obtained by adding Sb or Bi, or both of Sb and Bi to a material in which a molar ratio of the Gete compound to the $(Sb—Bi)_2Te_3$ (a value of GeTe compound/$(Sb—Bi)_2Te_3$) is 4 to 12;

the composition of the Ge—Sb—Bi—Te-based material is within a region which is bounded by composition points $A(Ge_{41.2}, (Sb—Bi)_{7.4}, Te_{51.4})$, $B(Ge_{39.8}, (Sb—Bi)_{10.5}, Te_{49.7})$, $C(Ge_{28.5}, (Sb—Bi)_{21.7}, Te_{49.8})$, and $D(Ge_{30.6}, (Sb—Bi)_{15.8}, Te_{53.6})$ in a triangular coordinate graph whose apices are Ge, Sb—Bi and Te, and a content of Bi contained in the Ge—Sb—Bi—Te-based material is 4 atom % and more and less than 13 atom %; and the interface layer (excluding one containing a hafnium oxide, one containing a cerium oxide, one containing a carbide and one containing carbon) comprises a Zr oxide.

2. The optical information recording medium according to claim 1, wherein the recording layer consists of Ge, Sb—Bi and Te.

3. The optical information recording medium according to claim 1, wherein the recording layer further comprises at least one element selected from Ag, In, Se, Sn, Al, Ti, V, Mn, Fe, Co, Cr, Ni, Cu, Zn, Zr, Ga, Si, Dy, Pd, Pt, Au, N, O, S, B, C and P and a total amount of the at least one element is 5 atom % or less.

4. The optical information recording medium according to claim 1, wherein the first protective layer comprises ZnS in an amount of 60 mol % or more and a thickness of the first protective layer is 100 nm or more and less than 150 nm.

5. The optical information recording medium according to claim 1, wherein the second protective layer comprises ZnS in an amount of 60 mol % or more and a thickness of the second protective layer is 35 mn or more and less than 55 nm.

6. The optical information recording medium according to claim 1, wherein the either or both of the first interface layer and the second interface layer consists of a mixture represented by a formula:

$(ZrO_2)_M(Cr_2O_3)100-M$ (mol %)

wherein M is a compositional ratio represented by mol % and satisfies 20=M=80.

7. The optical information recording medium according to claim 1, wherein the first interface layer comprises a Zr oxide and a thickness of the first interface layer is 0.5 nm or more and less than 10 nm.

8. The optical information recording medium according to claim 1, wherein the either or both of the first interface layer and the second interface layer consists of a mixture represented by a formula:

$(ZrO_2)_X(Cr_2O_3)_Y(SiO_2)_{100-X-Y}$ (mol %)

wherein X and Y are compositional ratios represented by mol % and satisfies 20=X=70 and 20=Y=60 and 60=X+Y=90.

9. The optical information recording medium according to claim 1, wherein a thickness of the second interface layer is 0.5 nm or more and less than 10 nm.

10. The optical information recording medium according to claim 1, wherein a film thickness of the recording layer is 5 nm or more and less than 15 nm or less.

11. The optical information recording medium according to claim 1, wherein the reflective layer is a material comprising Ag in an amount of 90 atom % or more and a film thickness of the reflective layer is 60 nm or more and less than 140 nm.

12. The optical information recording medium according to claim 1, which comprises an optical absorption layer, wherein the optical absorption layer is provided between the reflective layer and the second protective layer.

13. The optical information recording medium according to claim 1, wherein two or more recording layers are provided and at least one of the recording layer comprises the Ge—Sb—Bi—Te-based material.

* * * * *